March 29, 1966   J. W. JACOBS   3,242,589
APPARATUS FOR RECLAIMING SOLVENT FROM USED FILTER CARTRIDGES
Original Filed Oct. 27, 1961   3 Sheets-Sheet 1

INVENTOR.
James W. Jacobs
BY
Frederick M. Ritchie
His Attorney

INVENTOR.
James W. Jacobs
BY Frederick M. Ritchie
His Attorney

March 29, 1966     J. W. JACOBS     3,242,589
APPARATUS FOR RECLAIMING SOLVENT FROM USED FILTER CARTRIDGES
Original Filed Oct. 27, 1961     3 Sheets-Sheet 3

INVENTOR.
James W. Jacobs
BY Frederick M. Ritchie
His Attorney

United States Patent Office 3,242,589
Patented Mar. 29, 1966

3,242,589
APPARATUS FOR RECLAIMING SOLVENT FROM USED FILTER CARTRIDGES
James W. Jacobs, Dayton, Ohio, assignor to General Motors Corporation, Detroit, Mich., a corporation of Delaware
Continuation of application Ser. No. 148,249, Oct. 27, 1961. This application May 22, 1963, Ser. No. 282,838
6 Claims. (Cl. 34—133)

This invention relates to a domestic appliance and more particularly to improved apparatus for recovering solvent from a dry cleaning system filter cartridge and is a continuation of my copending application Serial No. 148,249, filed October 27, 1961, now abandoned.

Solvent usage constitutes a major concern in the operation of dry cleaning apparatus and various elaborate arrangements have been devised to reclaim solvent in order to minimize the cost of operation. In a replaceable filter system, such as taught in the copending application Serial No. 105,733, filed April 26, 1961, and assigned to the same assignee, now Patent 3,132,501, it is desirable to rid the filter cartridge of as much solvent as possible before the cartridge is disposed of.

Accordingly, it is an object of this invention to recover solvent from an expendable dry cleaning filter cartridge before it is disposed of.

A more particular object of this invention is the provision of a control arrangement for exposing a filter cartridge to air pressure to force entrapped solvent therefrom before the cartridge is disposed of.

Another more particular object of this invention is the provision of a drying cabinet for reclaiming solvent from cartridges removed from a dry cleaning apparatus including a washer, a dryer, and an adsorber wherein the exhaust air from the dryer is passed through the drying cabinet before entering the adsorber to vaporize solvent from the cartridges.

Further objects and advantages of the present invention will be apparent from the following description, reference being had to the accompanying drawings wherein a preferred embodiment of the present invention is clearly shown.

Figure 1:
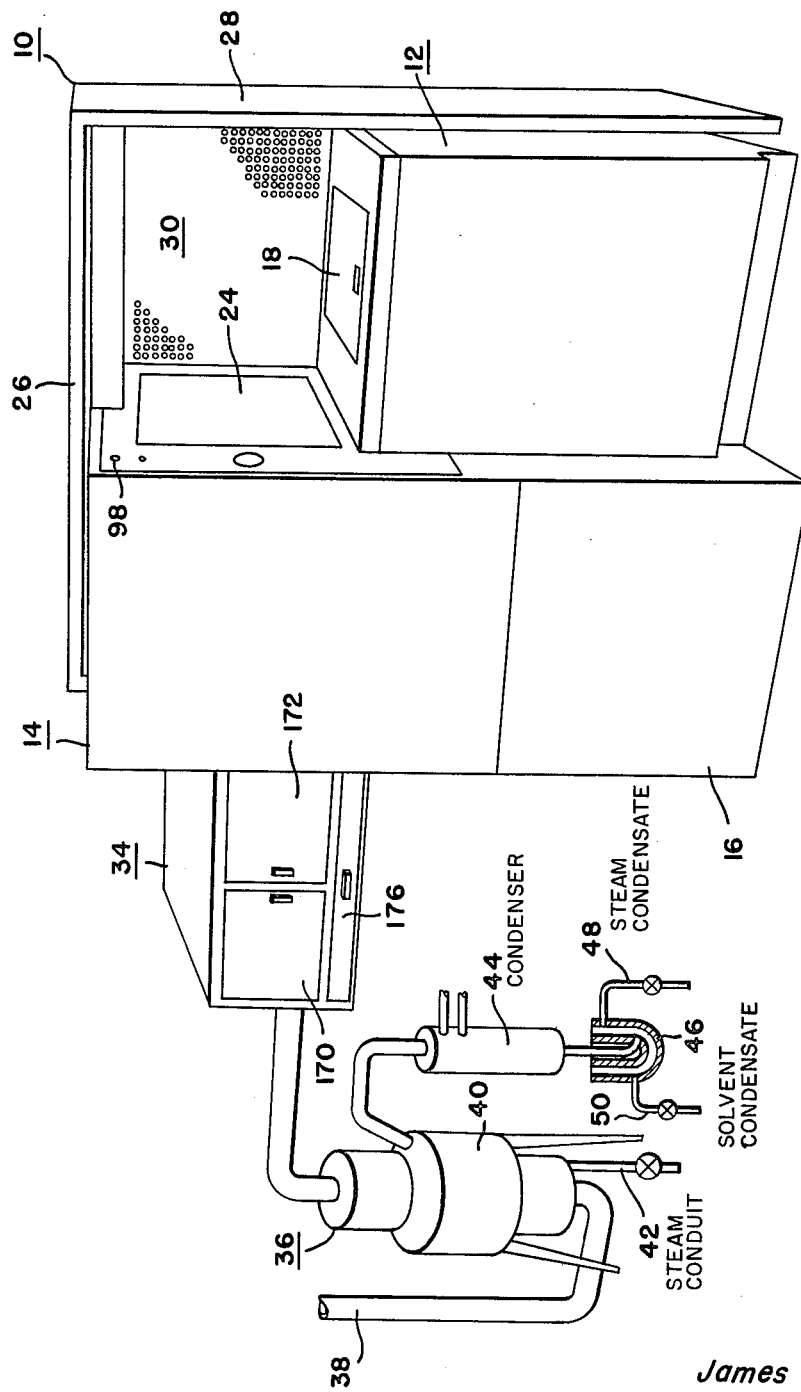
FIGURE 1 is a perspective front vew of dry cleaning apparatus provided with this invention.

In accordance with this invention and with reference to FIGURE 1, a dry cleaning system is pictorially illustrated. The system includes an outer cabinet 10 for partially enclosing a clothes washer or agitating apparatus 12 and a clothes dryer or drying apparatus 14. Note that the clothes dryer 14 is elevated above the floor to provide for a filter compartment cabinet 16 therebelow. The clothes washer 12 has a top access door 18 which is pivotally openable for inserting and removing fabrics from the washer.

The clothes dryer 14 has a front access opening 24 which faces the washer access opening 18 adjacent one side thereof. This arrangement places the access doors 18 and 24 in a confined area defined by top wall 26 and a side wall 28 of the dry cleaning cabinet 10—a perforate grille 30 at the rear of the confined space operating to withdraw fumes from the area whenever either access door 18 or 24 is opened. The outlet or vent grille 30 is connected through a venting system at the rear of the cabinet to the atmosphere as set forth more fully in the commonly assigned copending application Serial No. 105,733, filed April 26, 1961, and to which reference may be had for greater detail regarding the dry cleaning apparatus.

The successful operation of the foregoing dry cleaning apparatus depends on the efficiency with which solvent is retained in the system. Filtered circulating solvent, such as perchlorethylene, is very volatile by nature and will vaporize quickly if not contained in some manner. In accordance with this invention, a filter cartridge is utilized which is replaceable after a period of usage. However, when the cartridge is removed, there is still considerable solvent retained in the pores of the cartridge; and it is to the reclaiming of this entrapped solvent that the present invention is directed.

To accomplish this solvent reclamation, a cartridge drying cabinet 34 is positioned adjacent the dryer 14 and adapted to receive the hot drying air being exhausted from the dryer. On the outlet side of the drying cabinet 34 is arranged a conventional solvent adsorbent system shown generally at 36, such as taught in the patent to Victor 2,910,137 which issued October 27, 1959. In general, the adsorbent apparatus has an exhaust pipe 38 to the atmosphere and an adsorbing portion 40 for entrapping the solvent vapors prior to exhausting the solvent-free air to the atmosphere. Steam supplied through the inlet pipe 42 during regeneration of the adsorbent releases the solvent vapor from the adsorbent and carries it into a water-cooled condenser 44. There, solvent condenses and flows into a U-tube 46 from which steam condensate or water may be drawn off through a pipe 48 and condensed solvent through a pipe 50.

Figure 2:
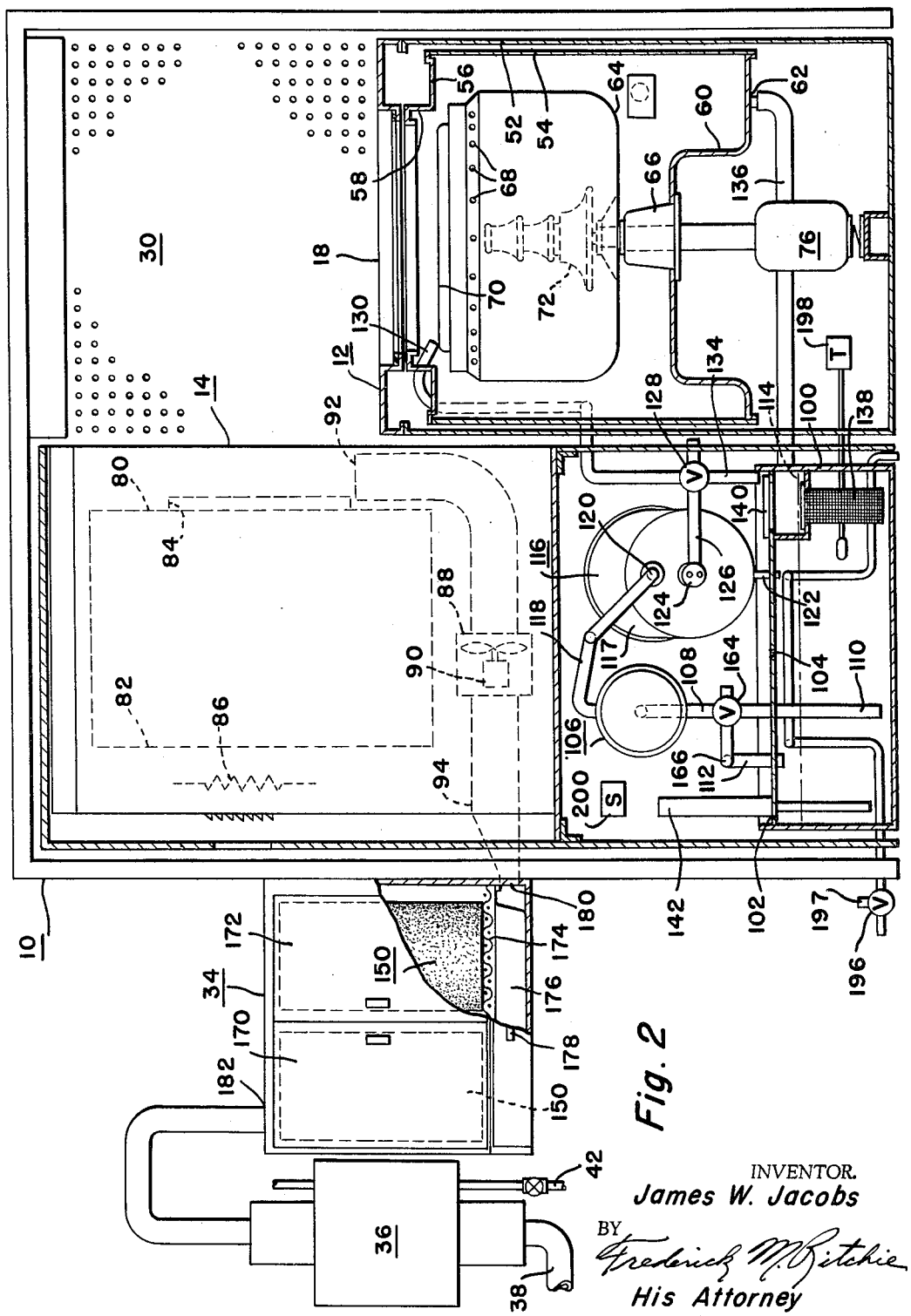
FIGURE 2 is a sectional view partly in elevation to show the inner workings of the dry cleaning apparatus shown in FIGURE 1.

Turning now to FIGURE 2, the washer or agitating apparatus 12 is shown comprised of an outer cabinet 52 in the top wall of which is located the access door 18, hinged along a rear edge thereof. Within the washer cabinet 52, a generally cylindrical, imperforate solvent container 54 is disposed which includes a subtop portion 56 having an access opening 58 in axial alignment with the top access lid 18 of the washer. A bulkhead 60 closes the lower end of the solvent container 54 and includes a drain opening 62 in a lowermost portion thereof. A generally cylindrical spin tub 64 is rotatably supported by a resiliently inverted cup-like member 66 on the bulkhead 60 and includes a plurality of circumferentially arranged outflow ports 68 around an upper portion thereof. The tub 64 has a top access opening 70 which aligns with the opening 58 and the opening closable by the door 18 immediately above. Within the spin tub 64, an agitator 72 is adapted for vertical reciprocation. A motor-driven agitating and spinning mechanism is shown generally at 76 and is adapted to vertically reciprocate the agitator 56 when operated in one manner and to rotate or spin the tub 64 when rotated in another manner. By way of suggesting one suitable agitating and spinning mechanism, such as 76, but not by way of limiting this invention, reference may be had to the patent to Clark 2,422,395, issued June 17, 1947.

The clothes dryer 14 is a conventional, single pass, circulating air dryer substantially like that taught in the patent to Whyte 2,843,945 issued July 22, 1958. The dryer includes a horizontally rotatable tumbling drum 80 having a perforate rear wall 82 and a front access opening 84 in alignment with the dryer door 24. A drying heater 86 is disposed adjacent the perforate rear wall 82 of the tumbling drum and adapted to be energized for drying clothes within the tumbling drum. During operation of the heater 86 and rotation of the tumbling drum 80, air is circulated by fan, show generally at 88, driven by a motor 90 which may also be connected through a conventional pulley system for rotating the tumbling drum 80. The fan 88 is connected with the drum access opening 84 by way of a front duct 92, said front duct being exhausted by the fan through an exhaust duct 94 connected to the drying cabinet 34. The dryer includes a push button 98 (FIGURE 1) for initiating a predetermined drying cycle at the conclusion of wash after the clothing have been removed from the washing apparatus and placed in the tumbling drum 80.

The circulating system for a dry cleaning fluid or solvent, such a perchlorethylene (a somewhat toxic dry cleaning fluid) or Valclene (a nontoxic dry cleaning fluid made by the DuPont Corporation which is essentially Freon 113) will now be described with reference to FIGURES 2 and 3. The main components of the circulating system include a sump 100 having a top wall 102 with an air vent and spill-over return 104. Above the sump top wall 102 is a pump 106 which has its inlet 108 connected through a solvent suction dip tube 110 to the bottom of the sump 100 and a vapor suction line 112 above the surface 114 of the solvent in the sump. A filter 116 is adapted to receive the output of the pump through a sloped conduit 118 which connects to the inlet 120 of the filter. Filter 116 is positioned angularly in the filter compartment 16, such that a restricted gravity drain 122 extends through the sump wall 102 to substantially drain the filter of solvent when the dry cleaning system is shut down. At one end of the filter, an outlet fitting 124 connects by way of a conduit 126 through a three-way valve 128 to the tub access opening 70—a terminal portion 130 overlying the top of the spin tub 64. The three-way valve 128 may be controlled by a solenoid 132 into a first position connecting the filter outlet 124 to the spin tub 64 (solenoid deenergized) and a second position connecting the filter outlet to a sump return line 134 (solenoid energized). Completing the circulating system is a conduit 136 which connects to the drain outlet 62 of the solvent container 54. This conduit 136 enters the sump 100 by way of a button trap 138, access to which is gained through a removable lid 140 for cleaning the trap device as well as for adding additional solvent to the system. A sight glass 142 or other suitable means may be used for providing a visual indication of the dry cleaning fluid level.

The fluid circulation system operates as follows. The pump 106 draws dry cleaning fluid or solvent from sump 100 through the dip tube 110. This dry cleaning fluid, cleaned of large objects by the trap 138, is forced through the conduit 118 to the filter 116. The filter, which will be described more fully hereinafter, is effective to filter small solids, solubles and carbon from the dry cleaning fluid. After an initial period in which the three-way valve 128 returns the solvent to the sump, the valve is actuated by deenergizing solenoid 132 and the filtered dry cleaning fluid is then discharged from the filter by way of the conduit 126 and its end nozzle 130 into the spin tub 64. When the level of dry cleaning fluid within the tub reaches the outflow ports 68, the dry cleaning fluid will overflow into the solvent container 54 and will return by gravity through the conduit 136 to the sump 100—the button trap 138 intercepting its flow to remove large objects from the fluid.

Figure 3:
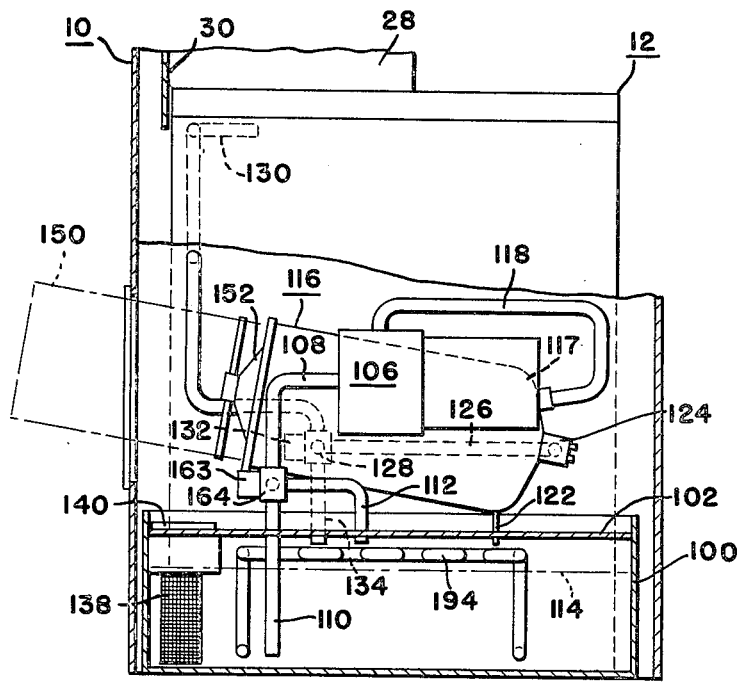
FIGURE 3 is a fragmentary sectional view, partly in elevation, to show the replaceable filter cartridge arrangement of this invention.

For the purposes of this invention and with reference to FIGURE 3, the arrangement of the filter 116 includes a filter casing 117 adapted to contain a removable throw-away filter element or cartridge shown generally as 150 in phantom line indicating that it is removable from the casing 117. This throw-away element 150 is retained in the filter casing by the removable door or cover 152 which is retained to the casing through an adjustable handle which is threadedly engaged with the outlet fitting 124 at the other end of the filter casing. Additional details of the filter construction may be found in the commonly assigned copending application Serial No. 105,733 filed April 26, 1961.

Figure 4:
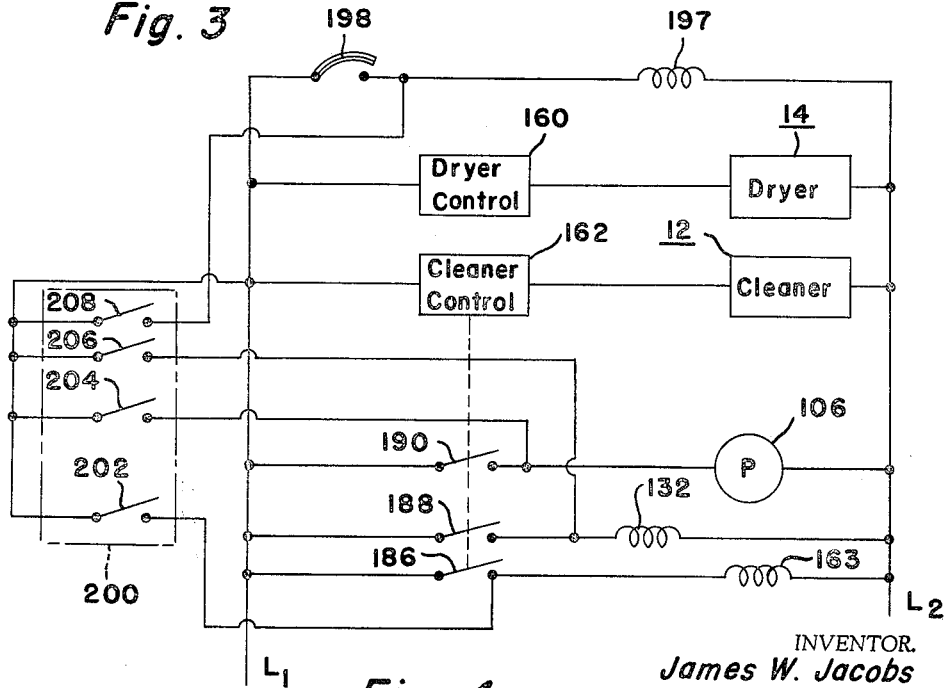
FIGURE 4 is a schematic wiring diagram suitable for the control of this invention.

The control circuitry necessary to operate the washing apparatus and the drying apparatus of this invention is shown in the last mentioned copending application and reference may be had thereto for complete details in this regard. In FIGURE 4 such circuitry has therefore been shown schematically as 160 for the dryer 14 and 162 for the washer or cleaner 12. The remaining additional circuitry in FIGURE 4 applies to the instant improvement over the copending application and attention will therefore be directed toward this improvement only.

Together with the circuitry of FIGURE 4, this invention is directed to reclaiming the solvent from the cartridges 150 both before and after they are removed from the filter casing 117. Firstly, the conservation procedures before removal of the filter cartridge will be explained.

This invention is concerned with removing the maximum amount of solvent from the cartridges 150 prior to removing the cartridges from the filter casing 117. This is a reclaiming process which is designed as follows. To the washer or cleaner control 162 (FIGURE 4) is added three timer switches 186, 188 and 190. These timer switches are respectively in control of the solenoid 163 for the pump inlet valve 164, the solenoid 132 for the filter outlet valve 128 and the pump 106. Additionally, condenser 194 is positioned with coils just above the surface 114 of the solvent in the sump 100 and adapted to receive cold water through a condenser inlet valve 196 operated by solenoid 197. The valve 196 is thermostatically controlled by a thermostat 198 having its temperature responsive bulb within the sump solvent. Under normal operating conditions, the condensing coil 194 is effective to maintain the solvent in the sump at a given temperature to restrain the volatile characteristics of the solvent and to minimize vaporization thereof.

In operation the foregoing timer switches 186, 188, 190 and the sump thermostat 198 are all by-passed by a reclaim switch 200 which has simultaneously operable internal switches 202, 204, 206 and 208 for shunting out the timer switches and the sump thermostat. The reclaim switch 200 is actuated to its ON or closed position only when it is determined that the filter cartridge 150 must be replaced. Such determination may be made by pressure gauges (not shown) on opposite sides of the filter 116 showing an increased pressure drop across the filter cartridge to indicate that the cartridge is badly clogged. The closing of the reclaim switch 200 energizes the pump inlet valve solenoid 163, the pump 106 and the filter control valve solenoid 132 along with the water solenoid 197. Since valve 164 thereby connects the pump to the dip tube 112, this conditions the pump to pump air from the top of the solvent tank through the filter element and return it to the sump 100. This action first forces the liquid solvent from the pores of the filter cartridge 150 followed by the solvent vapor which is forced to the sump where it is reclaimed by condensing on the water-cooling coil 194. After a period of time sufficient to clear the cartridge, the reclaim switch 200 is opened either manually or automatically with a time delay device and the filter element is removed relatively free of solvent ready to be placed in the drying cabinet 34 for complete removal of remaining solvent vapors.

The cartridge drying chamber 34 (FIGURE 2) is shown comprised of a box-like cabinet having a pair of doors 170, 172 at the front thereof for hingedly exposing the interior of the cabinet. The interior of the cabinet is divided by a screen or perforated surface 174 for supporting expended and removed filter cartridges 150. Beneath the screen 174 is a smaller compartment for slidably receiving a tray 176 having a handle 178 at the front thereof for slidably removing the tray from the drying cabinet 34. The tray 176 serves to catch sludge and other large particles including gravity drippings of solvent from the cartridges 150. On one side of the screen 174 is an air inlet 180 into the cabinet and on the other side of the screen is an air outlet 182 from the cabinet. Thus, air entering the cabinet 34 is caused to pass around the used cartridges 150 and out of the cabinet before entering the adsorbing apparatus 36 as described hereinbefore. It should be recognized that the dryer 14 is used to remove solvent from the clothes after they are removed from the washing apparatus 12. Heated air is used for this purpose which must be exhausted from the dryer along with the entrained solvent which has been vaporized from the tumbling clothes. It is this heated dryer exhaust air which is passed through the drying cabinet 34 to vaporize the entrained solvent from the inner pores of the filter cartridge. In leaving the drying cabinet 34, both the dryer exhaust and the solvent entrained from the used cartridges are passed to the adsorbing equipment. A considerable savings is realized in this economizer cabinet 34 wherein the unused or waste heat from the dryer is used to dry out the used cartridges.

It should now be seen that an economical system of reclaiming solvent from dry cleaning apparatus has been evolved. The solvent is totally removed from a disposable cartridge before it is thrown away by first utilizing air pressure to force solvent retained in the cartridge pores back to the sump and, secondly, by utilizing the heated dryer exhaust in a drying cabinet to remove the remaining solvent from the cartridge.

While the embodiment of the present invention, as herein disclosed, constitutes a preferred form, it is to be understood that other forms might be adopted.

What is claimed is as follows:

1. For use with a dry cleaning system for clothes or the like having tub means for retaining a dry cleaning solvent during a clothes cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown away and comprising, in combination, casing means having one chamber adapted to receive and retain a solvent soaked fabric during a drying period and another chamber adapted to receive said solvent soaked filter cartridge, duct means for interconnecting said one chamber to said another chamber in series air flow relationship, means operable to facilitate the vaporizaztion of solvent from a fabric placed in said one chamber, blower means operable for effecting a stream of air sequentially through said one chamber and then through said another chamber, control means for operating said means to facilitate the vaporization of solvent simultaneously with said blower means in a controlled drying cycle to dry fabric in said one chamber while said duct means is interconnecting said one chamber with said another chamber and said stream of air is being effected from said one chamber through said another chamber, thereby to vaporize the solvent from said filter cartridge in said another chamber with the waste vaporizing potential remaining in said stream of air after said stream of air dries said fabric in said one chamber, and means downstream from said another chamber for reclaiming the vaporized solvent from the stream of air exhausting from said another chamber.

2. For use with a dry cleaning system for clothes or the like having tub means for retaining a dry cleaning solvent during a clothes cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown away and comprising, in combination, casing means having one chamber adapted to receive and retain a solvent soaked fabric during a clothes drying period and another chamber adapted to receive said solvent soaked filter cartridge, duct means for interconnecting said one chamber to said another chamber in series air flow relationship, means operable for moving said one chamber to agitate a fabric placed in said one chamber, blower means operable for effecting a stream of air sequentially through said one chamber and then through said another chamber, control means for operating said moving means simultaneously with said blower means in a controlled drying cycle to dry fabric in said one chamber while said duct means is interconnecting said one chamber with said another chamber and said stream of air is being effected from said one chamber through said another chamber, thereby to vaporize the solvent from said filter cartridge in said another chamber with the waste vaporizing potential remaining in said stream of air after said stream of air dries said fabric in said one chamber, and means connected in air stream receiving relationship to said chambers downstream thereof for reclaiming vaporized solvent from said stream of air.

3. For use with a dry cleaning system for fabric or the like having tub means for retaining a dry cleaning solvent during a fabric cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown-away and comprising, in combination, casing means having a first chamber for containing solvent soaked fabric during a fabric drying period and a second chamber in juxtaposition to said first chamber for containing said solvent soaked filter cartridge, a solvent soaked fabric in said one chamber, a solvent soaked filter cartridge in said second chamber, said first chamber being operable for agitating said fabric in a fabric drying cycle, blower means operable to sequentially convey a given quantity of air first through said first chamber to vaporize the solvent from said fabric and then through said second chamber and around said filter cartridge to vaporize the solvent from said filter cartridge during a fabric drying cycle, heating means upstream from said first chamber operable for heating said air, control means energizable for simultaneously operating said first chamber, said blower means and said heating means in said fabric drying cycle, a first amount of heat in said quantity of air being expended in said first chamber to dry the fabric and a second amount of heat in said quantity of air being expended in said second chamber to dry the filter cartridge while said control means is energized to effect said fabric drying cycle, said second amount of heat comprising the waste heat remaining in said quantity of air downstream from said first chamber, said second chamber forming a filter cartridge drying compartment having a compartment inlet adapted to receive said quantity of air from said first chamber, support means in said compartment adapted to support said filter cartridge in said quantity of air, access means to said compartment for loading said filter cartridge into said compartment, means in said compartment in gravity flow relationship to the support means for catching droppings from said filter cartridge and for removing said droppings from said compartment, and means connected to said chambers downstream thereof in receiving relationship to said quantity of air for reclaiming vaporized solvent from said quantity of air.

4. For use with a dry cleaning system for fabric or the like having tub means for retaining a dry cleaning solvent during a fabric cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown away and comprising, in combination, casing means having a first chamber for containing solvent soaked fabric during a fabric drying period and a second chamber in juxtaposition to said first chamber for containing said solvent soaked filter cartridge, a solvent soaked fabric in said one chamber, a solvent soaked filter cartridge in said second chamber, said first chamber being operable for agitating said fabric in a fabric drying cycle, blower means operable to sequentially convey a given quantity of air first through said first chamber to vaporize the solvent from said fabric and then through said second chamber and around said filter cartridge to vaporize the solvent from said filter cartridge during a fabric drying cycle, heating means upstream from said first chamber operable for heating said air, control means energizable for simultaneously operating said first chamber, said blower means and said heating means in a fabric drying cycle, a first amount of heat in said quantity of air being expended in said first chamber to dry the fabric and a second amount of heat in said quantity of air being expended in said second chamber to dry the filter cartridge while said control means is energized to effect said fabric drying cycle, said second amount of heat comprising the waste heat remaining in said quantity of air downstream from said first chamber, said second chamber forming a filter cartridge drying compartment having a compartment inlet adapted to receive said quantity of air from said first chamber, support means in said compartment adapted to support said filter cartridge in said quantity of air, access means to said compartment openable for loading said filter cartridge into said compartment, and means connected to said chambers downstream thereof in receiving relationship to said quantity of air for reclaiming vaporized solvent from said quantity of air.

5. For use with a dry cleaning system for clothes or the like having tub means for retaining a dry cleaning solvent during a clothes cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown away and comprising, in combination, a clothes dryer for solvent soaked clothes having container means operable to agitate clothing therein during a clothes drying period, blower means connected to said container means and operable to effect a stream of air through said container means to an exhaust duct, heating means upstream from said container means and operable to heat said stream of air, and control means energizable simultaneously to operate said container means, said blower means and said heating means in a clothes drying cycle, drying chamber means in juxtaposition to said container means and connected to said blower means downstream from said container means and in air receiving relationship to said exhaust duct while said control means is energized to effect said clothes drying cycle, means in said drying chamber means adapted to support said solvent soaked filter cartridge in heat transfer relationship to said stream of air exhausting from said exhaust duct during said clothes drying cycle whereby the waste heat in the stream of air downstream from said container means remaining after said stream of air dries said clothing in said container means is useable in said drying chamber means to dry said filter cartridge, and means connected in air stream receiving relationship to said drying chamber means downstream thereof for reclaiming solvent dried out of said filter cartridge.

6. For use with a dry cleaning system for clothes or the like having tub means for retaining a dry cleaning solvent during a clothes cleaning period, a filter container, a throw-away filter cartridge in said container and removable therefrom, and means for directing said solvent to said tub means through said filter container and said filter cartridge, apparatus for reclaiming solvent from a used, solvent soaked filter cartridge removed from said container and before said cartridge is thrown away and comprising, in combination, a clothes dryer for solvent soaked clothes having container means operable to agitate clothing therein during a clothes drying period, blower means connected to said container means and operable to effect a stream of air through said container means to an exhaust duct, heating means upstream from said container means and operable to heat said stream of air, and control means energizable simultaneously to operate said container means, said blower means and said heating means in a clothes drying cycle, drying chamber means connected to said blower means downstream from said container means and in air receiving relationship to at least a portion of the stream of air exhausting from said exhaust duct while said control means is energized to effect said clothes drying cycle, means in said drying chamber means adapted to support said solvent soaked filter cartridge in heat transfer relationship to said portion of said stream of air exhausting from said exhaust duct during said drying cycle whereby the waste heat in said portion of the air stream downstream from said container means remaining after said portion dries said clothing in said container means is useable in said drying chamber means to dry said filter cartridge, and means connected in air stream receiving relationship to said drying chamber means downstream thereof for reclaiming solvent dried out of said filter cartridge.

References Cited by the Examiner

UNITED STATES PATENTS

| | | | |
|---|---|---|---|
| 2,181,672 | 11/1939 | Sutcliffe et al. | 34—32 |
| 2,310,680 | 2/1943 | Dinley | 34—133 |
| 2,539,407 | 1/1951 | Dinley | 34—82 |
| 2,910,137 | 10/1959 | Victor | 8—141 |
| 3,002,287 | 10/1961 | Smith | 34—133 |
| 3,034,221 | 5/1962 | Tuck et al. | 34—133 |
| 3,095,284 | 6/1963 | Victor | 34—32 |

WILLIAM F. O'DEA, *Primary Examiner.*

NORMAN YUDKOFF, *Examiner.*

F. E. DRUMMOND, J. F. O'CONNOR,
*Assistant Examiners.*